United States Patent [19]

Runquist et al.

[11] Patent Number: 4,666,799
[45] Date of Patent: May 19, 1987

[54] CURRENT COLLECTORS FOR BATTERIES HAVING CATHODE-ELECTROLYTES AND BATTERIES INCORPORATING SAME

[75] Inventors: Jonas A. Runquist, Minneapolis; William G. Howard, St. Paul; David R. Berberick, Maple Grove, all of Minn.

[73] Assignee: Medtronic, Inc., Minneapolis, Minn.

[21] Appl. No.: 732,064

[22] Filed: May 9, 1985

Related U.S. Application Data

[63] Continuation-in-part of Ser. No. 533,128, Sep. 19, 1983, abandoned.

[51] Int. Cl.⁴ .............................................. H01M 6/14
[52] U.S. Cl. .................................... 429/101; 429/162; 429/178; 429/196
[58] Field of Search ............... 429/101, 105, 196, 121, 429/122, 178–184, 162, 209

[56] References Cited

U.S. PATENT DOCUMENTS

| 3,245,837 | 4/1966 | Ikeda et al. | 429/181 |
| 3,496,018 | 2/1970 | Hamlen et al. | 429/181 X |
| 3,776,778 | 12/1973 | Azuana et al. | 429/178 X |
| 3,907,590 | 9/1975 | Saunders | 429/181 X |
| 4,265,984 | 5/1981 | Kaye | 429/178 |
| 4,315,060 | 2/1982 | Goebel et al. | 429/122 |
| 4,332,867 | 6/1982 | Tsuda et al. | 429/122 X |
| 4,376,811 | 3/1983 | Goebel | 429/178 X |
| 4,394,059 | 7/1983 | Reynolds | 429/178 X |

Primary Examiner—Anthony Skapars
Attorney, Agent, or Firm—Vidas & Arrett

[57] ABSTRACT

Improved current collector design for controlling battery current capability by providing consistent controlled surface area contact between the carbon element of the current collector and its electrical terminal means.

6 Claims, 8 Drawing Figures

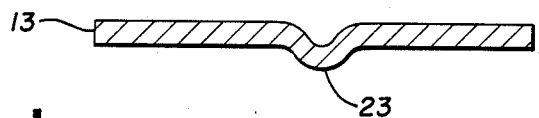
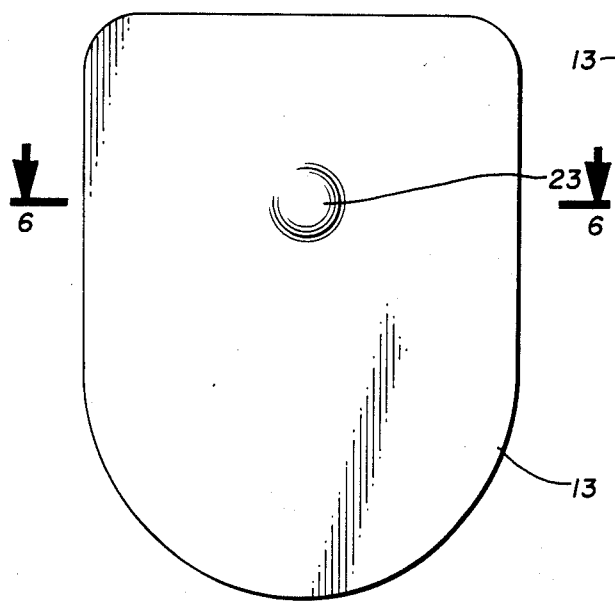
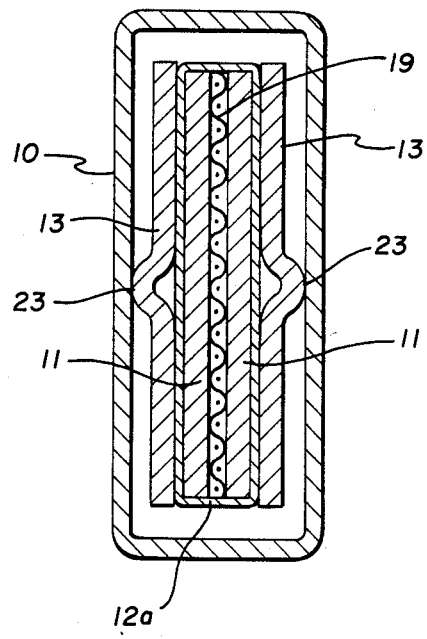
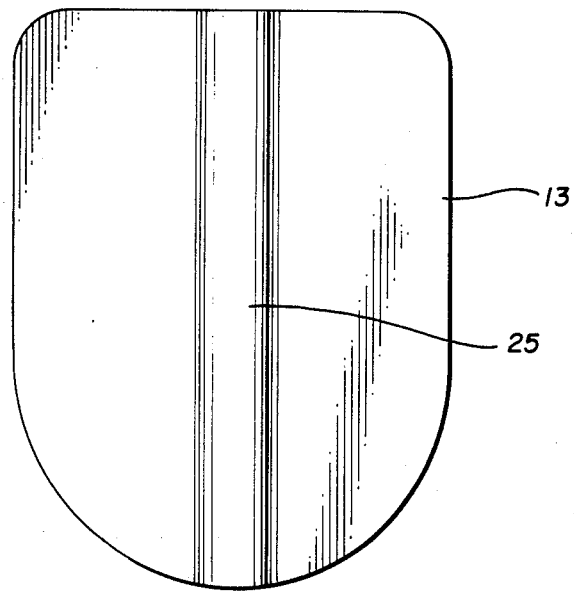

CURRENT COLLECTORS FOR BATTERIES HAVING CATHODE-ELECTROLYTES AND BATTERIES INCORPORATING SAME

BACKGROUND OF THE INVENTION

This application is a continuation-in-part of application Ser. No. 533,128, filed Sept. 19, 1983, now abandoned.

This invention relates broadly to batteries of the type which comprise active or oxidizable metal anodes and cathode-electrolytes of the type containing certain materials capable of acting both as an electrolyte carrier, i.e., as a solvent for an electrolyte salt, and as the active cathode material for the battery. Such batteries are known in the art and are described by way of example in U.S. Pat. No. 4,328,289, issued May 4, 1982 to Zupancic, et al; U.S. Pat. No. 4,264,687, issued Apr. 28, 1981 to Dey, et al and U.S. Pat. No. 3,998,657, issued Dec. 21, 1976 to Auborn, et al.

Batteries of this type are desirable for many low rate applications such as powering heart pacemakers and other medical implanted devices, fire alarms, watches and calculators. The most common and well-known battery of this type is the lithium/thionyl chloride battery which will be described further hereinbelow with reference to the preferred embodiment of this invention.

These kinds of batteries also include a cathode current collector which is exposed to the cathode electrolyte as is the oxidizable active anode. This invention is specifically concerned with improved current collectors for such batteries.

Broadly speaking, the active oxidizable anode material for these batteries is usually preferably lithium metal. However, other oxidizable anode materials are used in these kinds of batteries and generally include the other alkali metals, such as sodium and potassium, etc., and alkaline earth metals such as calcium and alloys of these metals. The anode may typically be constructed of the oxidizable metal in contact with a suitable supporting metal grid. The grid for a lithium anode, for example, may be made of nickel, nickel alloys such as Monel, stainless steel, tantalum or platinum.

The cathode-electrolyte solvents known to be useful in these batteries, in addition to thionyl chloride, include sulphur dioxide and other fluid oxyhalides, non-metallic oxides, halogens, non-metallic halides and mixtures thereof such as phosphorus oxychloride ($POCl_3$) selenium chloride ($SeCl_2$), sulphur trioxide ($SO_3$), vanadium oxytrichloride ($VOCl_3$), chromicoxychloride ($Cr_2Cl_2$), sulphuric oxychloride ($SO_2Cl_2$), nitrile chloride ($NO_2Cl$), nitrosyl chloride ($NOCl$), nitrogen dioxide ($NO_2$), sulphur monochloride ($S_2Cl_2$) bromine ($Br_2$), chlorine ($Cl_2$) and sulphur monobromide ($S_2Br_2$). Solvents of this type can be used together with thionyl chloride ($SOCl_2$) or separately. Other non-aqueous solvents may be included along with the aforementioned cathodic active materials such as organic solvents including propylene carbonate, acetonitrile, methyl formate, tetrahydrofuran and the like which have been generally used in non-aqueous high energy density lithium and lithium/$SO_2$ cells.

Preferably, the electrolyte salt or salts included in the cathode-electrolyte as the solute thereof should provide an acceptable conductivity at the operating temperature of the environment within which the battery is to be used. Examples of electrolyte salts commonly used in various batteries of this type include alkali and alkaline earth metal halides, tetrahaloaluminates, tetrahaloborates, and soluble lithium salts such as $LiiCl_4$, $LiSbCl_6$, $Li_2TiCl_6$, $LiAlBr_4$, $LiBCl_4$ and $LiBF_4$.

As already indicated, the batteries of the type described herein also require a cathode current collector which includes a porous element of an inert conductive material in contact with the cathode-electrolyte. Preferably, the porous element of the current collector is a high-surface-area body of any particular shape and form required for the particular battery design contemplated. Porous carbon cathode elements are preferred. Satisfactory carbon cathode current collector elements of this type may be formed by pressing particulate carbon such as carbon black or acetylene black or graphite to a desired form. To impart a cohesive characteristic to such particulate pressed bodies, a suitable binder material may be added to the particulate. Suitable binder materials for this purpose include polytetrafluoroethylene, fluorinatedethylene propylene polymer, polyethylenetetrafluoroethylene, polychlorotrifluoroethylene, polyethylene chlorotrifluoroethylene and the like. Polytetrafluoroethylene is the preferred binder for carbon current collectors. The binder, when used, may be added in an amount between about two percent and about sixty percent by weight of the formed cathode current collector.

Although porous carbon or graphite such as Shawinigan carbon black (Shawinigan Products Co., Englewood Cliffs, N.J.) are generally the most preferred inert cathode current collector materials, other inert conductive materials such as nickel and stainless steel have been used as cathode current collectors in the types of cells with which this invention is concerned.

Batteries of the aforementioned type may also employ a suitable separator to prevent the reaction of anode and cathode materials when no electric current flows through the external circuit. Since the cathode material is not spontaneously reactive with the anode material, mechanical separators which only prevent contact between the two electrodes can be used. A wide variety of ceramic and plastic materials having small pore sizes are available for this purpose. Examples of such materials include: alumina, beryllia, magnesia, zirconia, titania, porcelain, porous glass, fritted glass, non-woven porous polytetrafluoroethylene and other fluoronated polymers, polypropylene and polyethylene. A preferred porous separator is the fiberglass cloth which is typically used as filter paper. Such cloth, known as "glass paper" may be obtained from Mead Corp., Specialty Paper Div., South Lee, Mass. 01260.

As already pointed out, the various aforementioned elements of the battery must be placed in operating relationship whereby both the anode and cathode current collector, although maintained in a spaced relationship, are exposed to the cathode-electrolyte. The separator, if used, is placed between the anode and the cathode current collector and is also exposed to the cathode-electrolyte.

The container for such a battery may be made of various metals such as iron, nickel or preferably stainless steel or it may be made of plastic coated metals, or other suitable materials. Insofar as the preferred form of this invention is concerned, the container will be of a metal such as stainless steel and will be adapted to function as the cathodic or positive terminal for the battery by being placed into direct contact with the cathode current collector.

Cells of the aforementioned type have been found to be susceptible to a thermal run-away reaction which tends to generate heat in the battery faster than the battery structure can dissipate it. In extreme situations this can result in partial melt-down of cell constituents such as the anode material, and has even been reported as causing minor explosions. In this connection reference may be made in U.S. Pat. No. 4,307,160 issued Dec. 22, 1981 to Shipman, et al.

It has been discovered that these disadvantages can be effectively controlled by introducing into the cell design unique features relating to the cathode current collector which effectively control the current capability of the battery, i.e., minimize it, thereby increasing the safety of the battery.

More specifically, for any given battery design such as one utilizing a carbon element for the current collector and a thionyl chloride containing cathode-electrolyte, which is the preferred embodiment of this invention, too large a surface area contact between the carbon element and its terminal or electrical contact, which in the case of the preferred embodiment is the battery case itself, fosters the aforementioned thermal runaway reaction. It is, therefore, desirable to control the surface area contact between the carbon element and the electrical terminal means, such as the battery case. The amount of this contact will, of course, depend on the current density desired and the particular design of the battery involved.

As a corollary to the above, the present invention provides, in the case of a battery designed to utilize the battery case as the cathodic or positive terminal, consistent contact between the carbon element and the case which is particularly important for constant reproducible electrical characteristics.

SUMMARY OF THE INVENTION

This invention provides improved cathode current collector designs and improved batteries of the aforementioned type wherein improved consistent contact between the porous cathode current collector element and its terminal means is provided. Control of the current capability of these batteries is provided along with increased cathode current collector apparent surface area and increased physical strength of the current collector per se. These objectives as well as others are achieved in the preferred embodiment of the invention by providing a porous cathode current collector element having raised contact areas on the surface thereof which are particularly adapted for contact with an electrical terminal means such as the battery case itself. The raised contact areas may take various forms such as an elongated rib or ribs or a discrete rounded elevation or elevations.

BRIEF DESCRIPTION OF THE DRAWINGS

FIG. 5 is a front elevational view of another embodiment of the invention showing a porous carbon cathode current collector element having a single discrete raised contact area thereon in the form of a rounded elevation;

FIG. 6 is a cross-section taken along line 6—6 of FIG. 5;

FIG. 7 is a schematic cross-sectional view similar to that of FIG. 4 showing carbon cathode current collector elements of the type shown in FIG. 6 in a battery case, and FIG. 8 is another front elevational view of an embodiment of the invention showing a carbon cathode current collector element having a single rib structure according to the invention;

DETAILED DESCRIPTION OF PREFERRED EMBODIMENT

Figure 1:
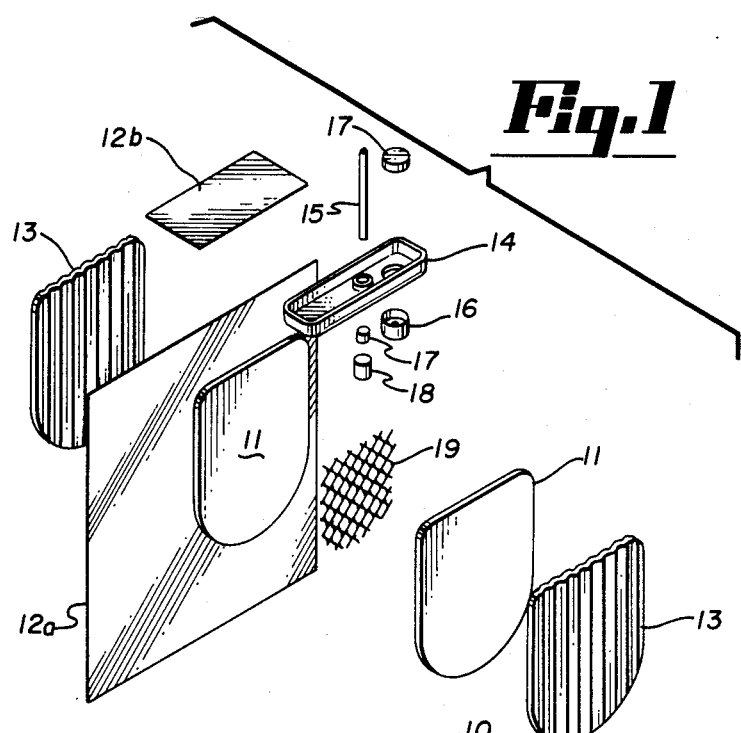
FIG. 1 is an exploded assembly drawing of a battery incorporating the features of the invention.

The exploded assembly drawing of FIG. 1 shows preferred embodiment of a battery according to the invention. The battery includes a can or container 10 having a closed end 10a and an open end 10b. Container 10 is formed of a conductive metal, perferably stainless steel. The battery also includes a lithium metal anode formed from two flat pieces 11 of lithium which are brought together on opposite sides of a nickel current collector screen 19. The lithium electrode may be formed by simply pressing the lithium together with screen 19 therebetween.

Preferably, however, a header assembly comprised of cover 14, which may be of stainless steel, is assembled including a feedthrough pin 15 surrounded by glass seal 17 which is in turn surrounded by feedthrough sleeve 18 all of which are welded to cover 14 along with fill tube 16 on the underside of the cover whereby the entire header subassembly may be attached to the lithium electrode by means of the lower depending portion of feedthrough pin 15 extending downwardly through cover 14. This lower depending portion may be welded or otherwise electrically connected to current collector screen 19 following which the lithium pieces 11 are then pressed together with the current collector therebetween to provide an electrical contact to the lithium anode.

The lithium anode is then wrapped with separator material which is preferably the aforementioned glass fiber filter paper and which may be cut to a convenient shape such as 12a and 12b, as desired. Piece 12b overlays the top of the electrode assembly underneath cover 14 when positioned in can 10.

The porous cathode carbon current collector elements comprise two ribbed bodies of carbon, which are brought together against the separator covered lithium electrode on opposite sides thereof to form a laminar structure consisting of outer layers of cathode current collector element, adjacent inner layers of separator material and still further inner layers of lithium electrode 11 and anode current collector 19.

The laminar structure and header sub-assembly connected thereto are inserted into can 10 through open end 10b thereof and cover 14 is welded to container 10. Liquid cathode-electrolyte solution, as described hereinabove, preferably thionyl chloride containing dissolved lithium aluminum chloride (LiAlCl$_4$) is used to fill any voids in container 10 by introducing it through fill tube 16 in cover 14. Following this, fill tube 16 is closed by means of metal plug 17 which is welded to seal the battery container.

As can be seen from the structure described with reference to FIG. 1, the laminar structure including the lithium anode and outer carbon cathode current collector elements allows the outer surfaces of the cathode current collector element 13 to contact the interior surfaces of the sidewalls of container 10. Since the contacting surfaces of the cathode current collector element 13 are formed to include raised contact areas in the form of elongated ribs 13a, it is readily apparent that less than the entire surface area of the cathode current collector element adjacent the interior surface of the container actually contact the container surface.

As already described hereinabove, such an arrangement allows the control, by design, of the amount of surface area contact between the porous cathode current collector element and its terminal or electrical contact means which in this case is the interior side surfaces of the container 10 which functions as the cathodic or positive terminal of the battery thereby limiting the cells current capability and avoiding the aforementioned thermal run-away problem. The amount of surface area contact required in any particular instance may be determined empirically by the particular design configuration and size of the battery in any given case. The amount of surface area contact desired can be readily controlled by including more or less ribs on the surface of the cathode current collector element, by controlling their spacing, by adjusting their size both in cross section and in length, etc. Alternatively, the raised contact areas may be formed on the interior surfaces of the container wall and the surface of the current collector may be smooth and flat. Further, both the current collector element surface and the container wall surface may include raised portions adapted to interfit relative to each other or to contact each other when brought together.

Figure 3:
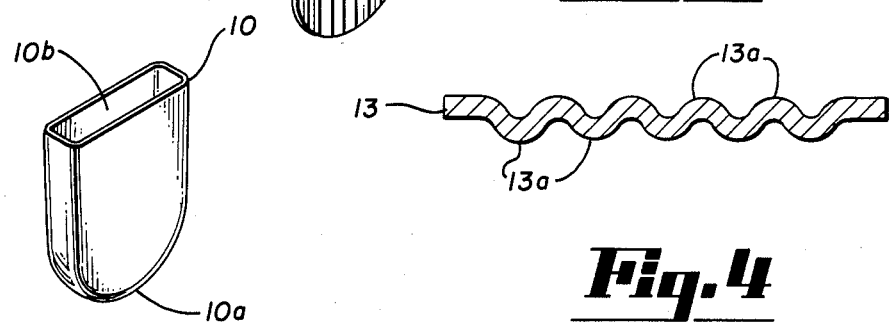
FIG. 3 is a cross-sectional view taken along line 3—3 of FIG. 2.
Figure 2:
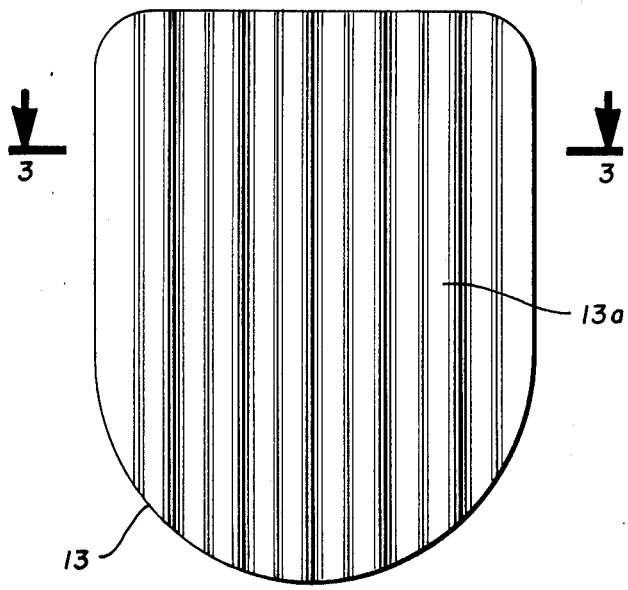
FIG. 2 is a front elevational view of a ribbed porous carbon cathode collector element according to the invention.
Figure 4:
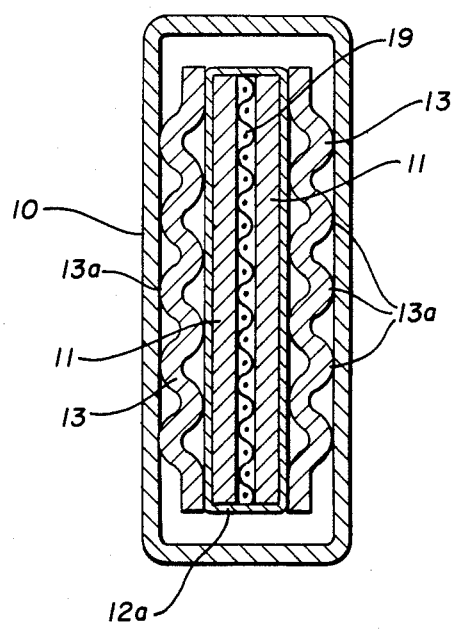
FIG. 4 is a schematic cross-sectional view showing ribbed cathode current collector elements of the type shown in FIGS. 2 and 3 in place in a battery case.

From the above description it will be apparent that only the surface of the cathode current collector element adapted to electrically contact its terminal means, such as, in this case the interior side surfaces of container 10, which functions as the cathodic or positive terminal of the battery, need be subjected to the design control of this invention. However, in the instance in which the porous cathode current collector element is formed by pressing a particulate material such as carbon to form the collector element, it is most convenient to fabricate a form such as is shown in FIGS. 2-4. This form provides ribbed configurations on both side surfaces of the cathode collector and although not necessary, can be conveniently utilized in the battery to provide cathode-electrolyte containing channels as can be seen in the schematic cross section of FIG. 4.

The raised contact areas need not be in the form of rib-like configurations but may also take the form of a simple rounded area 23 as shown on a carbon cathode current collector element 13 in FIGS. 5, 6 and 7. As shown, a single raised contact area may be used. Alternatively, a plurality may be incorporated as is deemed necessary to control surface area contact as is provided by such a configuration and illustrated in FIG. 7.

FIGS. 8, 9 and 10 illustrate a single rib configuration 25 for a porous cathode current collector element 13.

Other configurations for the raised contact areas may be substituted. It is, therefore, to be understood that, within the scope of the appended claims, the invention may be practiced otherwise than as specifically described.

What is claimed is:

1. In a laminar battery having a substantially flat, thin metal case containing an active laminar anode element and a pair of laminar porous cathode elements oppositely disposed with respect to the anode so that the inner laminar surfaces of the porous cathode elements are disposed adjacent opposite laminar surfaces of the anode element and the outer laminar surfaces of the cathode elements are disposed adjacent the inner sides of the flat metal case, and porous separator means interposed between the adjacent anode and porous cathode laminar surfaces, all of the elements being adapted and arranged into a laminar structure within the flat metal case; liquid cathode-electrolyte means disposed in the metal case and in contact with the elements, and electrically conductive means, insulated from the case, contacting the anode element and extending exteriorly of the case, the improvement comprising: providing at least one integral raised contact area associated between each of the outer laminar surfaces of each of the porous cathode elements and the respective inner sides of the metal case thereby adapting the case as a terminal of the battery and limiting the laminar surface contact between the porous cathode elements and the sides of the case to less than the full adjacent laminar surface areas thereof.

2. The battery of claim 1 wherein the anode is lithium and the cathode electrolyte includes thionyl chloride.

3. The battery of claim 1 wherein the raised contact area is in the form of a rounded elevation.

4. The battery of claim 1 wherein the cathode elements consist essentially of carbon.

5. The battery of claim 1 wherein the raised contact area is on the cathode element.

6. The battery of claim 1 wherein the raised contact area is in the form of an elongated rib-like configuration.

* * * * *